United States Patent [19]

Kundmüller et al.

[11] Patent Number: 5,454,455
[45] Date of Patent: Oct. 3, 1995

[54] CYLINDER PISTON DEVICE

[75] Inventors: Klaus Kundmüller, Donnersdorf; Werner Christel, Hambach, both of Germany

[73] Assignee: Fichtel & Sachs AG, Schweinfurt, Germany

[21] Appl. No.: 147,767

[22] Filed: Nov. 2, 1993

[30] Foreign Application Priority Data

Nov. 2, 1992 [DE] Germany .......................... 42 36 961.4

[51] Int. Cl.⁶ ..................................................... F16F 9/00
[52] U.S. Cl. .................. 188/321.11; 188/322.16; 267/64.25
[58] Field of Search ............... 267/64.11, 64.12, 267/64.13, 64.15, 64.26, 64.28; 188/297, 313, 316, 317, 322.16, 322.17, 322.18, 322.19, 322.22, 306; 248/354.4, 354.5

[56] References Cited

U.S. PATENT DOCUMENTS

| | | | |
|---|---|---|---|
| 2,774,446 | 10/1952 | De Carbon | 267/64.11 |
| 3,837,445 | 9/1974 | Pierle | 188/322.17 |
| 4,307,874 | 12/1981 | Reuschenbach et al. | 188/300 |
| 4,785,921 | 11/1988 | Hosan et al. | 188/300 |
| 5,064,030 | 11/1991 | Wössner | 188/297 |

FOREIGN PATENT DOCUMENTS

| | | | |
|---|---|---|---|
| 0496324 | 7/1992 | European Pat. Off. . | |
| 2103914 | 4/1972 | France . | |
| 2293632 | 7/1976 | France . | |
| 1109968 | 6/1961 | Germany | 188/322.17 |
| 1775344 | 7/1971 | Germany . | |
| 3901449 | 2/1990 | Germany . | |
| 3919945 | 12/1990 | Germany . | |
| 0028032 | 2/1983 | Japan | 188/322.17 |
| 0212548 | 12/1984 | Japan | 188/322.17 |

*Primary Examiner*—Robert J. Oberleitner
*Assistant Examiner*—Chris Schwartz
*Attorney, Agent, or Firm*—Nils H. Ljungman & Associates

[57] ABSTRACT

In a cylinder piston device the piston when approaching the end of the cylinder abuts against an indentation of the cylinder and is tilted or angled by the abutment, on the one hand, and by an axially directed force acting onto the piston rod, on the other hand. Thus, a clamping effect is obtained. By the clamping effect expulsion of the piston rod is prevented. Moreover, the tilting may result in a leakage condition of sealing rings. This allows pressurized fluid to escape. As a result, an increased security in case of high temperature development by fire is obtained.

27 Claims, 6 Drawing Sheets

CYLINDER PISTON DEVICE

BACKGROUND OF THE INVENTION

This invention relates to a cylinder piston device and more particularly to a mono-tube vibration damper.

Cylinder piston devices such as mono-tube vibration dampers and gas springs contain a pressurized gas. The existence of such a pressurized gas within cylinder piston devices is fundamentally not detrimental to the security of a motor vehicle equipped with such a cylinder piston device. Even under extreme conditions such as in case of fire resulting from an accident, modern components such as mono-tube vibration dampers and gas springs offer an extremely high security value. This high security value must, however, be paid by sophisticated design and expensive materials. As such, it is possible to overcome risks which theoretically could result from a situation in which by high temperature the pressure of the pressurized gas is increased and high expelling forces act onto the piston rod and the piston and cause high velocity of the piston rod and the piston.

High security standards can be achieved e.g. by the principles disclosed in German Publication 39 19 945 corresponding to U.S. Pat. No. 5,064,030.

A further design for avoiding security risks with cylinder piston devices is disclosed in European Publication 436 324A1. Both solutions are based on the idea of allowing an escape of fluid beyond a predetermined temperature or a predetermined pressure.

OBJECT OF THE INVENTION

It is an object of the present invention to provide cylinder piston devices such as mono-tube vibration dampers and gas springs with a very high security standard while maintaining a compact design, a reliable operation and while reducing the manufacturing, assembling and material requirements.

SUMMARY OF THE INVENTION

A cylinder piston device comprises a substantially cylindrical tube having an axis and two ends and defining a cavity therein. The cylindrical tube is provided adjacent a first one of its ends with bottom means and adjacent a second one of its ends with piston rod guiding and sealing means. A piston rod member axially extends through the piston rod guiding and sealing means and is capable of axial movement inward and outward of the cavity. A piston unit is connected to the piston rod member inside the cavity and separates two working chambers from each other within the cavity. The piston rod member and the piston unit can be regarded as portions of a piston rod-piston unit. Fluid filling means are provided within the cavity. These fluid filling means may provide an increased pressure in response to an increase of temperature such as occurs under fire conditions. The piston unit has circumferential radially outer piston unit face means which are radially engageable with circumferential radially inner cylinder tube face means of the cylinder tube. The piston unit may approach the piston rod guiding and sealing means in response to axial outward movement of the piston rod member.

Piston rod-piston unit tilting means are provided in a substantially axially fixed position with respect to the cylinder tube. This piston rod-piston unit is engageable with the piston rod-piston unit tilting means in response to axially outward movement of the piston rod member. The piston rod-piston unit is submitted to a tilting torque about a tilting axis substantially transverse to the axis of the cylinder tube in response to the piston rod-piston unit engaging the piston rod-piston unit tilting means and to the piston rod-piston unit being simultaneously loaded by an axially outward directed force. This tilting torque provides an improved axial coherence effect between the cylinder tube and the piston rod-piston unit against the action of the axially outward directed force.

By the tilting torque a clamping effect can be obtained between at least one of the following pairs of circumferentially extending face means which are mutually engaged in a substantially radial direction:

a) circumferential, radially outer piston unit face means of the piston unit, on the one hand, and circumferential, radially inner cylinder tube face means of the cylinder tube, on the other hand;

b) circumferential, radially outer piston rod face means of the piston rod member, on the one hand, and circumferential, radially inner guiding face means of the piston rod guiding and sealing means, on the other hand;

c) circumferential, radially outer face mans of the piston rod guiding and sealing means, on the one hand, and circumferential, radially inner cylinder tube face means of the cylinder tube, on the other hand.

It has been found by test series under fire condition that the expelling of the piston rod guiding and sealing means and of the piston-piston rod unit can be reliably avoided by using the principles of the present invention. The tilting torque which can be obtained in accordance with the present invention may provide a reorientation of the piston rod axis with respect to the axis of the cylinder tube such that a small acute angle is defined between both axes. By this reorientation one can reduce, on the one hand, the axial forces which can act in the expelling sense onto the piston rod guiding and sealing means. On the other hand, the coherence between the cylinder tube and the piston rod-piston unit against the action of axially outward directed forces can be improved. As such, the design and material requirements for providing a very high security standard can be reduced without reducing the security standard, particularly in view of security against fire conditions.

As a result of using the inventive principles, the assembling requirements can be reduced, and it becomes possible e.g. to use light metal forstructural parts of the piston rod sealing and guiding means. Structural parts made from aluminium alloys can be used which can be most easily manufactured by conventional manufacturing techniques. When applying the basic principles of the present invention the piston rod guiding and sealing means may be sealingly fastened with respect to the cylinder tube by conventional fastening means. The piston rod guiding and sealing means may comprise a terminal plug structure which is substantially radially engaged by radially outer circumferential face means of the plug structure with the circumferential, radially inner tube face means. The plug structure may be made from an aluminium alloy. The cylinder-side sealing means may be provided between the radially outer circumferential face means of the plug structure and the circumferential, radially inner cylinder tube face means. The terminal plug structure may be axially fixed with respect to the cylinder tube by at least one radially inward directed impression of the cylindrical tube engaging the terminal plug structure. This at least one radially inward directed impression may be either provided by an annular impression or by a plurality of circumferentially distributed individual impressions.

Generally spoken, the piston rod guiding and sealing means may comprise a structural body made at least partially of a material having reduced material strength as compared with the material from which the cylindrical tube is made. The cylindrical tubes are frequently made of steel, whereas the structural body can be made of a light metal such as an aluminium alloy when using the principles of the present invention.

Preferably, the piston rod-piston unit tilting means are located such that the piston rod-piston unit—when approaching the piston rod guiding and sealing means—comes into engagement with the piston rod-piston unit tilting means before abutting the piston rod guiding and sealing means. As such, all three of the above-mentioned clamping effects as defined by a), b) and c) may be obtained. As such, a considerable part of an outward directed expelling force onto the piston rod-piston unit is already compensated for before the piston unit comes into abutting engagement with the piston rod sealing and guiding means. But even assuming that the piston rod-piston unit finally comes into axial engagement with the piston rod guiding and sealing means, then the coherence of the piston rod guiding and sealing means with the cylindrical tube is improved so that the risk of expelling the piston rod guiding and sealing means with the piston unit is also reduced. The piston rod-piston unit tilting means may be provided by abutment means supported by the cylindrical tube. These abutment means may be integral with the cylindrical tube so that the number of components necessary for obtaining a cylinder piston device according to the present invention is not increased as compared with conventional designs.

Most preferably, the abutment means are provided by reduction in radius of the circumferential, radially inner cylinder tube face means along at least a part of the circumference thereof.

The concept of integrally shaping the abutment means from the cylinder tube may be realized in that a circumferentially extending indentation of the cylindrical tube or a group of circumferentially arranged individual indentations of the cylindrical tube are provided.

When the above-mentioned reorientation of the piston rod axis with respect to the cylinder axis is to be realized, the reduction in radius should be restricted to a circumferential angle about the axis of the cylindrical tube of less than about 180°.

The tilting means comprise preferably a sloped engagement face for being engaged by the piston rod-piston unit and more particularly by the piston unit when approaching the piston rod guiding and sealing means. As such, the sloped engagement face defines an acute angle with the axis of the cylindrical tube. The advantage of such a slope engagement face, the angle of which with respect to the generatrix of the cylindrical tube may be e.g. smaller than 30° and preferably smaller than 15°, is that the piston unit and more particularly the structural parts of the piston unit are subject to a radial compression force rather than to an axial sharing force. As such, the sensitivity of the piston unit against axial forces is also reduced. One can even consider the possibility of avoiding the concept of tilting and reorientation of the piston rod axis with respect to the cylinder axis by distributing sloped abutment means along the total circumference of the cylinder tube such as to obtain a radially inward directed, substantially symmetrical compression of the piston unit and thereby increase the stability of the piston unit against axial forces directed in the expelling sense.

The fluid filling means may comprise a volume of gas substantially filling the total cavity. In case of a mono-tube vibration damper the fluid filling means may e.g. comprise a damping liquid within the working chambers and a volume of pressurized gas adjacent at least one of the working chambers. The volume of pressurized gas may be separated from the respective liquid by a floating wall or membrane. This floating wall or membrane may be on either side of the piston unit, preferably it is provided on the side of the piston unit which is remote from the major part of the piston rod member. In accordance with conventional techniques, the working chambers may be interconnected through fluid flow passage means extending across the piston unit. These fluid flow passage means may be provided with a closing valve or with a damping valve. While in gas springs alternatively a closing valve or a damping valve may be used with the closing valve providing a locking possibility, mono-tube vibration dampers are generally provided with damping valve means.

When the tilting means are provided by abutment means and these abutment means are to be provided by indentations, it is possible to provide a plurality of indentations having a longer indentation axis substantially in parallel with a circumferential direction of the cylinder tube. Such identations can be easily obtained by an embossing tool. The indentation by an embossing tool can be easily made even after the vibration damper has been fully assembled. The number, the circumferential length, the depth and the profile of the indentations when regarded in a plane containing the axis of the cylinder tube, may be selected in accordance with tests for obtaining a maximum security effect.

The provision of individual indentations of relatively small circumferential length is preferable, because such a fluid transition gap may be maintained between the piston unit and the internal face of the cylindrical wall. Alternatively, such a transition gap for fluid may be obtained, if it does not exist under normal operational conditions. The restriction of the abutment means intended for providing a tilting effect to a circumferential area of less than 180° is helpful for obtaining a-relatively large inclination of the piston rod axis with respect to the cylinder axis and is also helpful for maintaining or obtaining a fluid transition gap between the cylinder tube and the piston unit.

The connection between the piston rod and the piston unit may be obtained in conventional way. E.g. an internal, terminal section of the piston rod member may be accommodated within an axial bore of the cylinder unit. Thus, it is even possible to obtain a further clamping effect by the inclination of the piston rod with respect to the piston unit and a corresponding radial expansion of the piston unit.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENT

Figure 1:
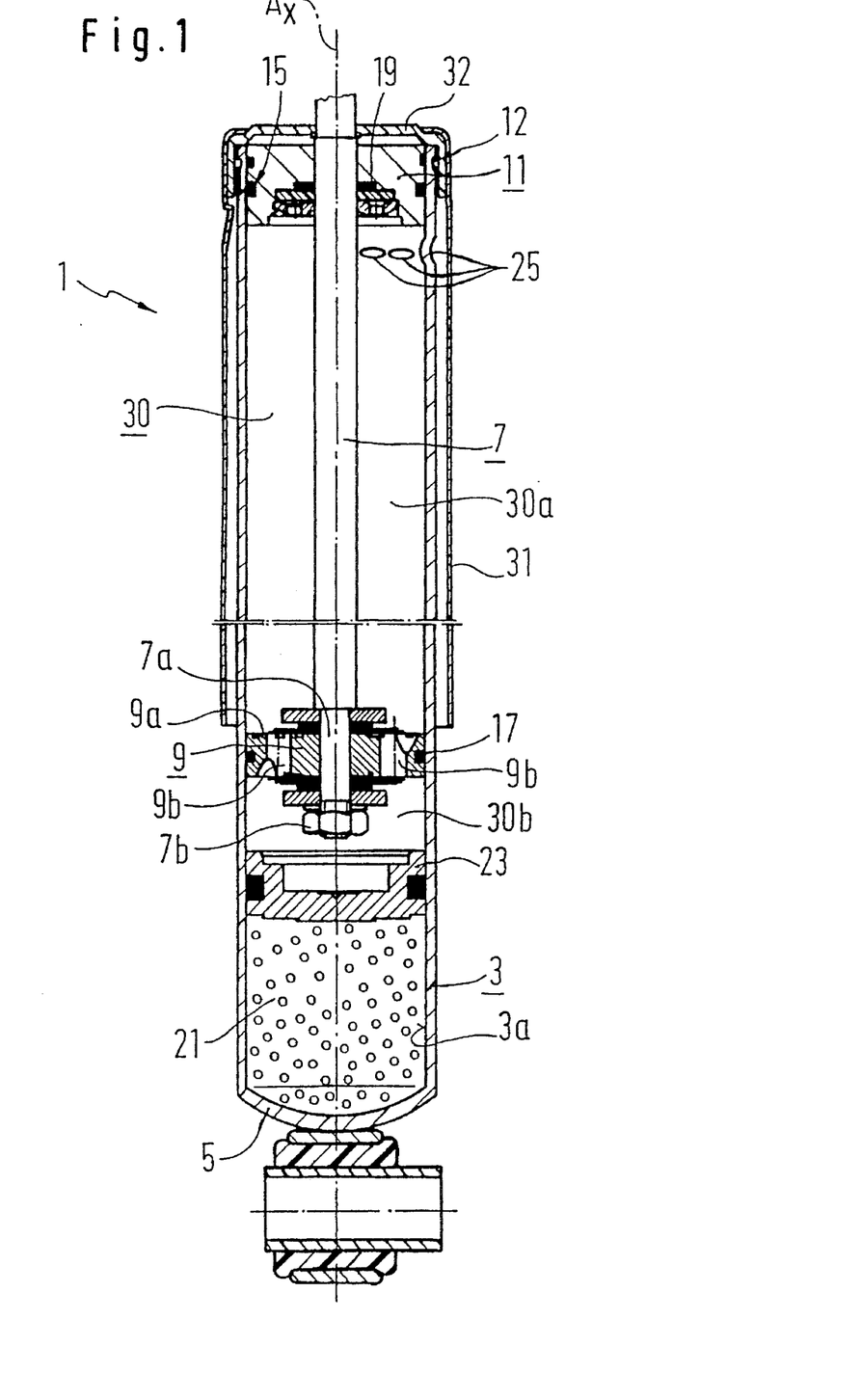
FIG. 1 shows a vibration damper for a vehicle according to the present invention in an operational condition.

In FIG. 1 there is shown a mono-tube vibration damper 1 which comprises a cylinder tube 3. This cylinder tube 3 has at its lower end a bottom portion 5 which closes the cylinder tube 3 at the lower end thereof. The upper end of the cylinder tube 3 is provided with a piston rod guiding and sealing unit 11. A piston rod 7 is guided through the piston rod guiding and sealing unit 11. A piston unit 9 is connected with the piston rod 7. This piston unit 9 is provided with a piston rod passage means 9b, which piston rod passage means 9b are provided by axially directed bores which are partially covered by valve plates biased towards a throttling position. The piston unit 9 comprises a piston member 9a. This piston member 9a is seated on a terminal section 7a of the piston rod 7 and fastened thereto by a nut 7b.

Within the cylinder tube 3 there is defined a cavity 30 which is divided by the piston unit 9 into two working chambers 30a and 30b. Adjacent the lower working chamber 30b there is provided a floating wall 23 which separates the lower working chamber 30b from a gas chamber 21. This gas chamber 21 is filled with a pressurized gas, whereas the working chambers 30a and 30b are filled with a liquid such as a hydraulic oil. The working chambers 30a and 30b are interconnected by the throttled passage means 9b as described above. On inward movement of the piston rod 7 with respect to the cylinder tube 3 an increasing volume of the piston rod 7 enters into the cavity 30 such that the floating wall 23 is moved downwards against the pressure of the pressurized gas in the gas chamber 21. On outward movement of the piston rod 7 with respect to the cylinder 3 the volume of the piston rod 7 within the cavity 30 is reduced such that the floating wall 23 is moved upwards by the biasing action of the pressurized gas within the gas chamber 21.

Upward and downward movement of the piston rod 7 with respect to the cylinder tube 3 is damped by the throttling effect of the throttled passage means 9b with respect to the liquid flow between the working chambers 30a and 30b. The direction of this liquid flow is different in response to the direction of axial movement of the piston rod 7 with respect to the cylinder 3. The throttling effect may be different for different directions of flow of the liquid through the passage means 9b. A piston rod protection sleeve 31 is fastened to the piston rod 7 by a carrier disc 32. More details of the vibration damper 1 are shown in FIG. 2.

Figure 2:
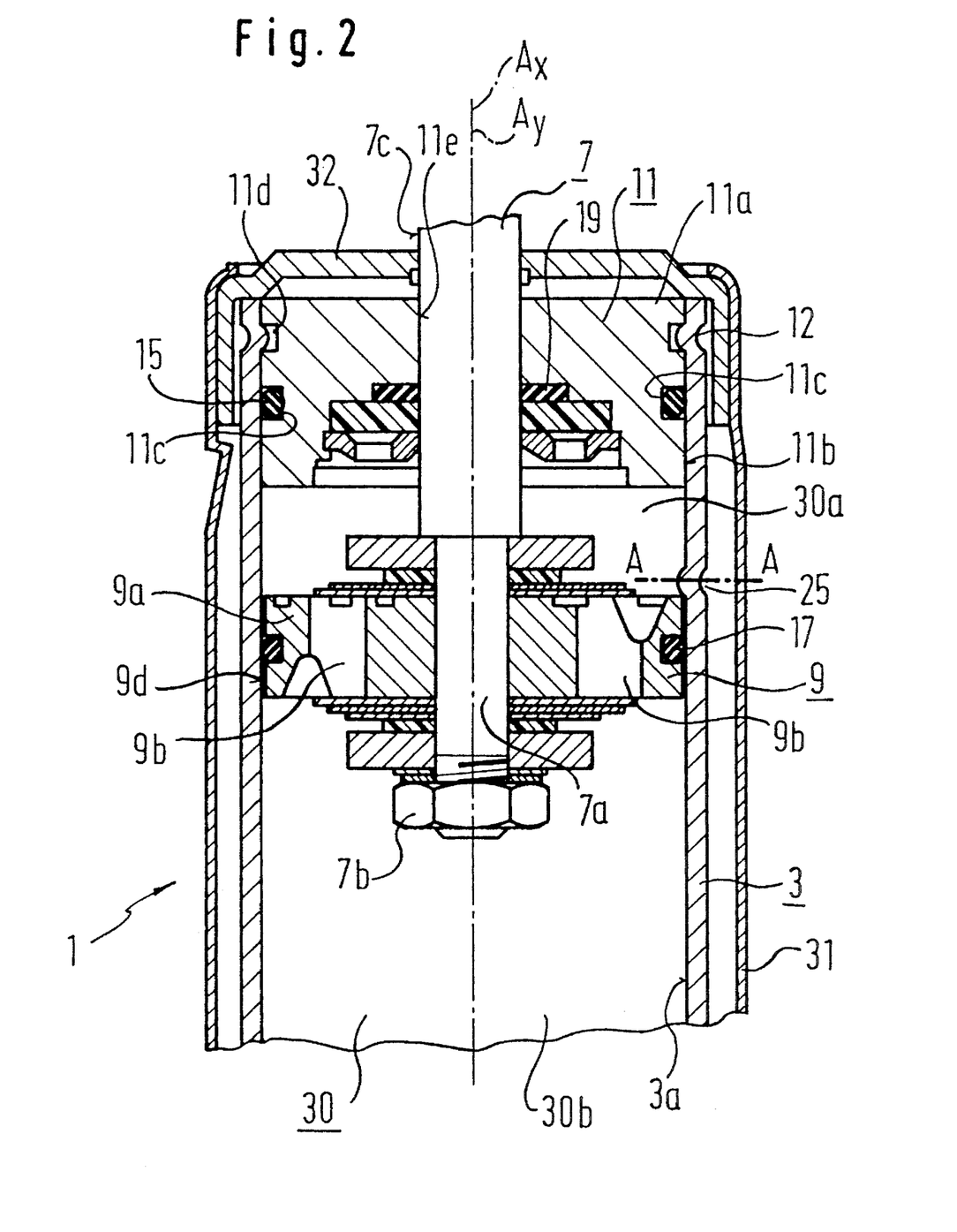
FIG. 2 shows a vibration damper according to FIG. 1 still in operational condition, when the piston unit has approached the piston rod guiding and sealing means.

In FIG. 2 the axis of the cylinder tube 3 is designated by $A_x$ and the axis of the piston rod 7 is designated by $A_y$. One can see from FIG. 2 that the axes $A_x$ and $A_y$ coincide in this status.

Considering now the piston rod guiding and sealing unit 11 in FIG. 2 one can note:

The piston rod guiding and sealing unit 11 comprises a plug structure 11a. This plug structure 11a is at least partially made by an aluminium alloy at least adjacent its radially outer circumference. The plug structure 11a is provided with a circumferential, radially outer face 11b. This face 11b is adjacent a radially inner, circumferential face 3a of the cylinder tube 3. A sealing groove 11c is provided in the circumferential, radially outer face 11b of the plug structure 11a. This sealing groove 11c accommodates a sealing ring 15. The sealing ring 15 is under small radial compression between the cylinder tube 3 and the bottom face of the groove 11c in the operational condition as shown in FIG. 2. The plug structure 11a is fastened with respect to the cylinder tube 3 by a circumferential, radially inward directed impression 12 which engages into a groove 11d of the plug structure 11a.

Inside the plug structure 11a there is provided a guiding surface 11e which is adjacent a radially outer surface 7c of the piston rod 7. A sealing ring 19 is located within the plug structure 11a and is in sealing engagement with the radially outer surface 7c of the piston rod 7.

Figure 3:
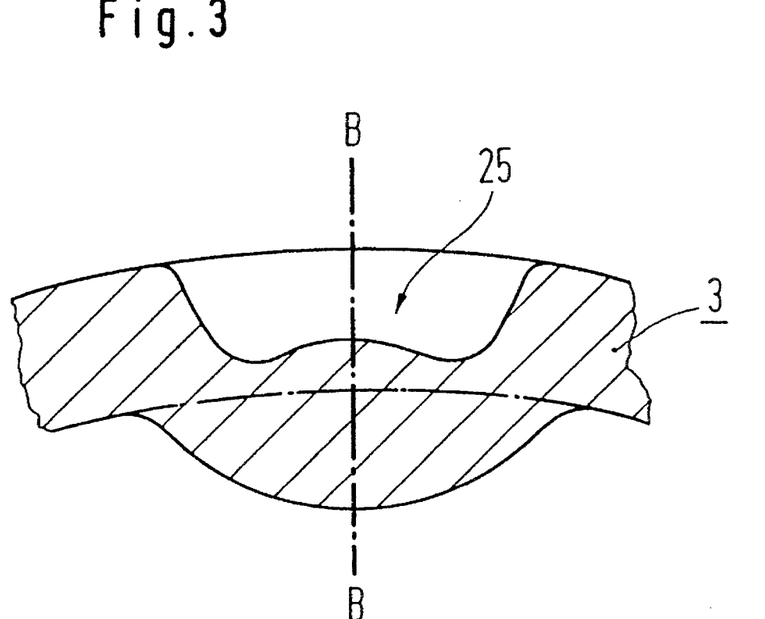
FIG. 3 shows a section according to line A—A of FIG. 2.
Figure 4:
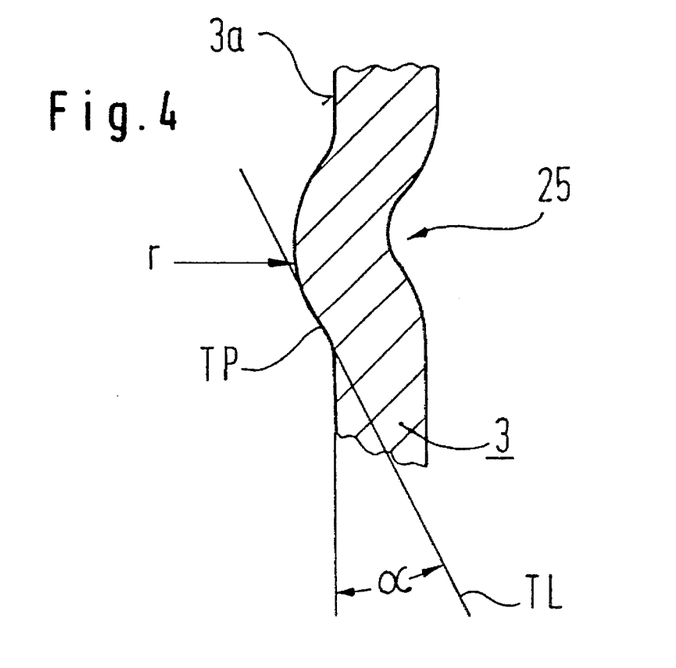
FIG. 4 shows a section according to line B—B of FIG. 3.

One can recognize in FIGS. 2, 3 and 4 an indentation 25 of the cylinder tube 3. This indentation 25 has a horizontal profile according to line A—A of FIG. 2 which is shown in FIG. 3 and a vertical profile according to line B—B of FIG. 3 which is shown in FIG. 4. The indentation 25 may be one of a plurality of indentations which are distributed along the half circumference of the cylinder tube 3 which is on the right side of $A_x$ in FIG. 2. One can see from FIG. 4 that the tangential line TL at the point TP to the cross-sectional configuration of the indentation 25 defines a small acute angle α with the radially inner surface 3a of the cylinder tube 3. This angle α corresponds to an angle α of the tangential line TL with respect to the axis $A_x$ as shown in FIG. 2.

In FIG. 2, the piston unit 9 has been moved upwards up to the indentation 25. It is assumed, however, that in normal operation it does not abut against the indentation 25 or— if it abuts thereto—no substantial axial forces are transmitted from the piston unit 9 to the indentation 25.

A small radial play exists between the radially inner guiding surface 11e and the radially outer surface 7c of the piston rod 7. Further, a radial play exists between the radially outer, circumferential surface 9d of the piston member 9a and the radially inner, circumferential surface 3a of the cylinder tube 3. These plays are compensated for in the normal operational condition by the annular sealing members 17 and 19. Further, a certain radial play may also exist between the radially outer, circumferential surface 11b of the plug structure 11a and the radially inner, circumferential surface 3a of the cylinder tube 3. This radial play is then compensated for by the annular sealing member 15.

One can easily see from FIGS. 2, 3 and 4 that by the indentation 25 or indentations the radius r of the inner circumferential surface 3a of the cylinder tube 3 is reduced in certain locations or along a half circle corresponding to the circumference of the cylinder tube 3 on the right-hand side of the axis $A_x$ as shown in FIG. 2

In case of a fire in a vehicle into which the vibration damper 1 is inserted, the temperature of the vibration damper 1 may increase considerably. The result is that the pressurized gas within the gas chamber 21 of FIG. 1 is strongly increased. As a result of this increased pressure the piston unit 9 and the piston rod 7 forming together a piston rod-piston unit are expelled in upward direction as seen in FIG. 2. While the upward movement of the piston rod 7 reduces the volume of the piston rod 7 inside the cavity 30 and thus increases the volume of the cavity 30, the pressure rise due to the high temperature is much greater than the pressure reduction due to the outward movement of the piston rod 7.

Now, the piston member 9a is urged with high pressure acting onto the cross-sectional area of the piston rod 7 against the indentation 25 or the plurality of excentrically arranged indentations 25. This has the following effects:

A first effect is that the piston member 9a is pressed along the tangent TL against the indentation 25. As the inclination α is rather small with respect to the axis $A_x$, the piston member 9a is radially compressed between the indentation 25 and the diagonally opposite face portion of the radially inner face 3a of the cylinder tube 3. Moreover, as the indentation 25 or indentations are provided only on the right-hand side of the cylinder tube 3 as shown in FIG. 2 and as, on the other hand, the force resulting from the pressurized gas acting onto the piston rod-piston unit 7,9, a tilting torque is exerted onto the piston rod-piston unit 7,9. This tilting effect is shown in more detail in FIG. 5.

Figure 5:
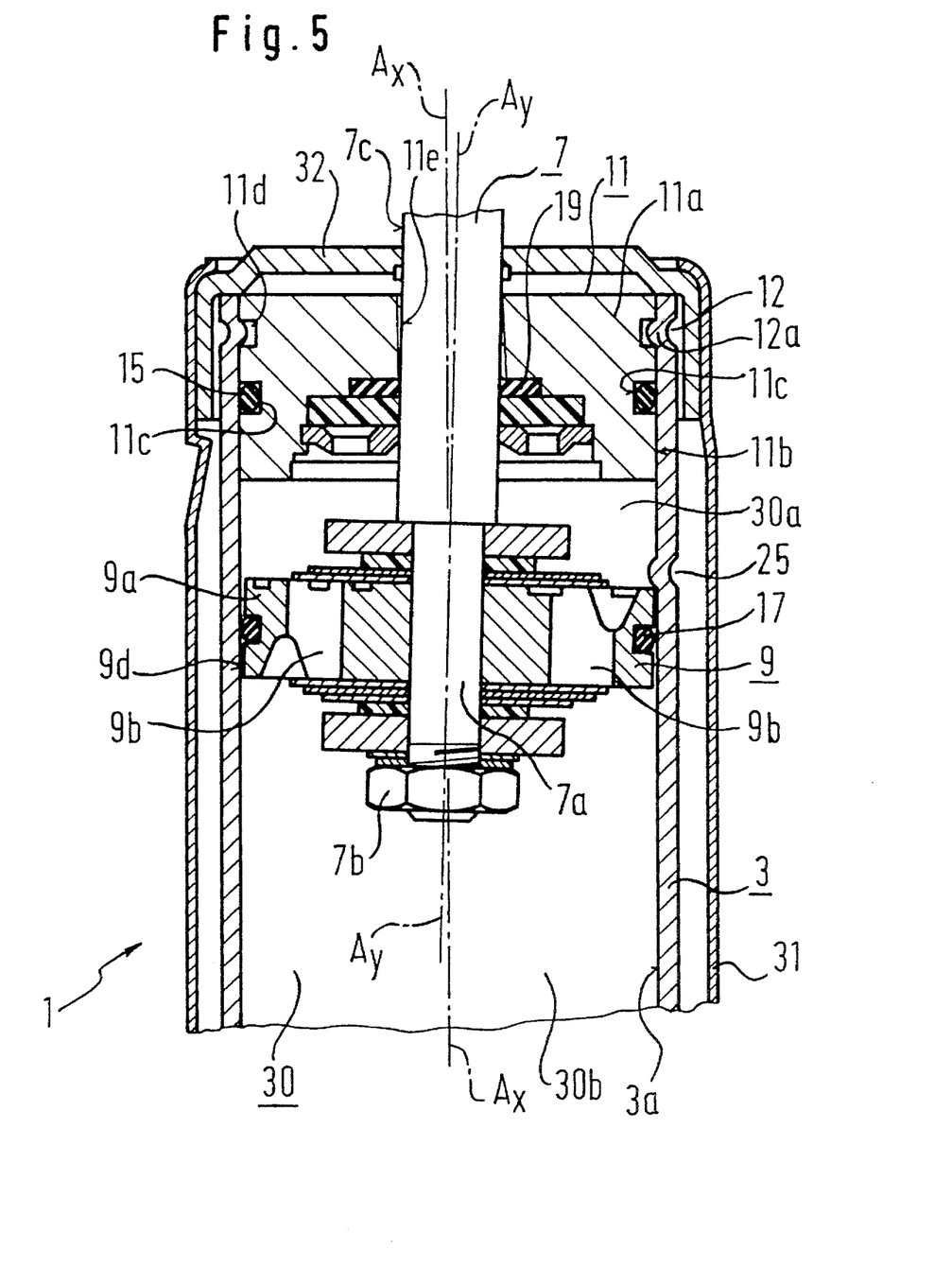
FIG. 5 shows a condition modified with respect to the condition of FIG. 2, when an excessive pressure has been built up within the cylinder.

One can note from FIG. 5 that the axis $A_y$ of the piston rod-piston unit 7,9 has been tilted with respect to the axis $A_x$ of the cylinder tube 3. This tilting is possible due to the play between the guide surface 11e of the plug structure 11a and the radially outer surface 7c of the piston rod 7 and is further made possible due to the radial play between the circumferential surface 9d of the piston member 9a and the radially inner surface 3a of the cylinder tube 3. Moreover, the inclination of the axes $A_x$ and $A_y$ may be facilitated by a radial play of the plug structure 11a with its radially outer circumferential face 11b with respect to the radially inner circumferential surface 3a of the cylinder tube 3. It is to be noted that for allowing the inclination of the axis $A_y$ with respect to the axis $A_x$ one must keep the axial heights of the radially outer surface 9d and of the radially inner surface 11e relatively small.

One can easily understand that due to the inclination of the axis $A_y$ of the piston rod-piston unit 7,9 with respect to the axis $A_x$ of the cylinder tube 3, a clamping effect is obtained between the piston member $9_a$ and the cylinder tube 3, on the one hand, and further a clamping effect is obtained between the piston rod 7 and the plug structure 11a. It was mentioned above that also a radial play might exist between the plug structure 11a and the cylinder tube 3. If a clamping effect is to be obtained between the piston rod 7 and the plug structure 11a and if a certain play exists between the piston rod 7 and the plug structure 11a, it is desirable that the plug structure 11a is not tiltable with respect to the cylinder tube 3 for obtaining a clamping effect. On the other hand, when the height of the engagement between the faces 11e and 7c is very large and no play exists between 7 and 11a, then a certain tilting of the plug structure 11a with respect to the cylinder tube 3 may be admitted for obtaining a good clamping effect. The tilting of the piston member 9a with respect to the cylinder tube 3 and of the piston rod 7 with respect to the plug structure 11a provides a clamping effect. This clamping effect and this highly increased friction provide a slow movement of the piston rod-piston unit 7,9 and the piston rod guiding and sealing unit 11 with respect to the cylinder tube 3 even when the engagement between the impressions or the annular depression 12 of the cylinder tube 3 into the annular groove 11d of the plug structure 11a is released due to the reduced strength of the aluminium material of the plug structure 11a at increased temperature.

One should note, moreover, that due to the inclination of the axis $A_y$ of the piston rod-piston unit 7 9 with respect to the axis $A_x$ of the cylinder tube 3, the sealing rings 17 and 19 become less effective. Particularly, the reduction in effectivity of the sealing ring 19 allows an escape of the pressurized liquid from the cavity 30 before the guiding and sealing unit 11 and the piston rod-piston unit 7,9 are expelled from the cylinder tube 3.

In FIG. 6, one can see that again the axis $A_y$ of the piston rod-piston unit 7,9 has been inclined with respect to the axis $A_x$ of the cylinder tube 3. Nevertheless, the plug structure 11a has been partially expelled from the cylinder tube 3, however, with a reduced velocity due to the clamping effect between the piston rod 7 and the plug structure 11a and possibly also due to a clamping effect between the plug structure 11a and the cylinder tube 3.

Figures 6, 6A:
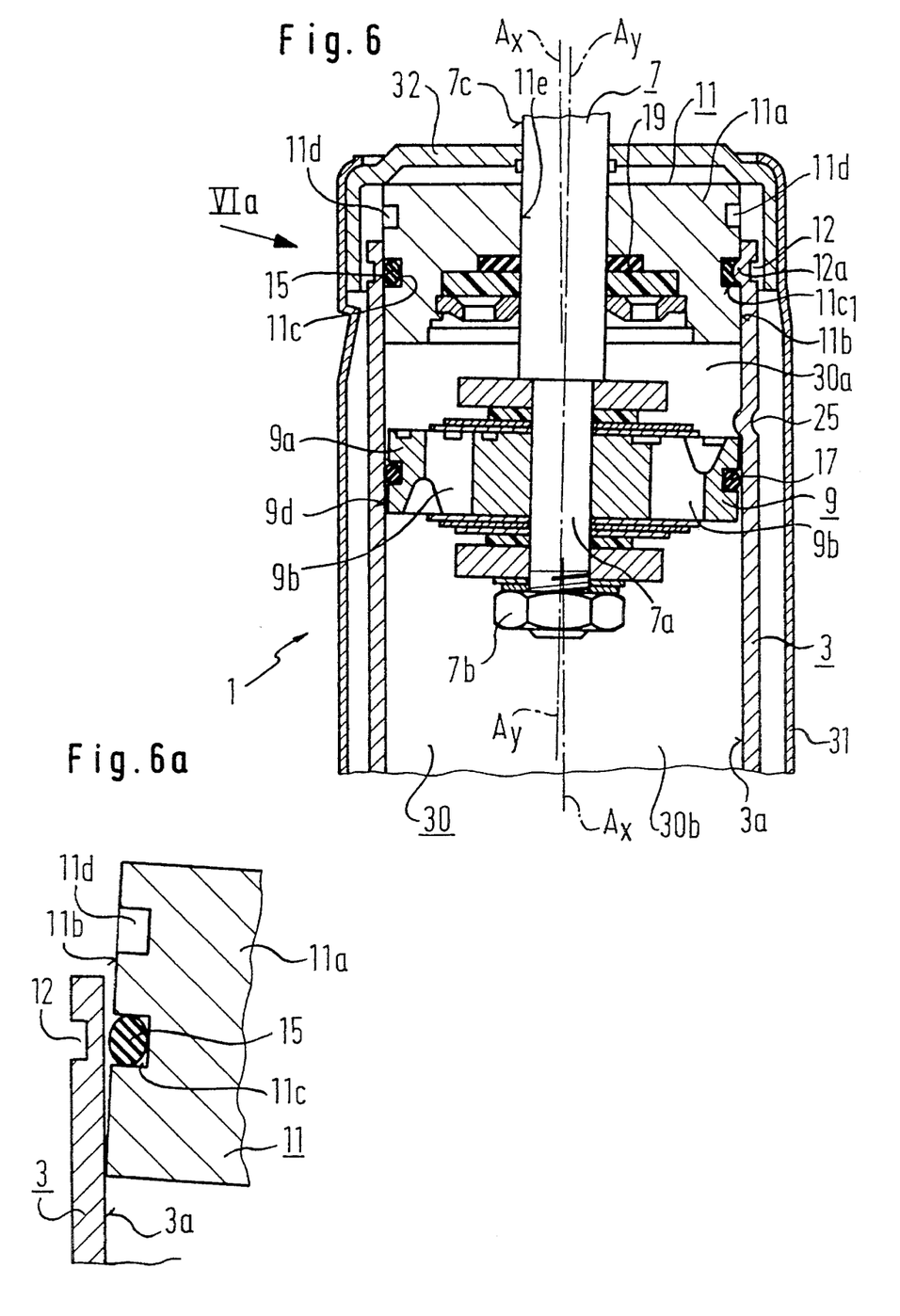
FIG. 6 shows a further status of the embodiment according to FIGS. 1 and 2, when the piston rod guiding and sealing means have been partially expelled from the cylinder tube in response to excessive pressure within the cylinder tube.
FIG. 6a shows a detail taken at VIa of FIG. 6.

The plug structure 11a partially extends beyond the upper end of the cylinder tube 3. When the plug structure 11a approaches the position as shown in FIG. 6, the tilting between the axes $A_x$ and $A_y$ can still be increased and the sealing engagement between the annular sealing member 19 and the piston rod 7 allows escape of pressurized liquid. So, when the plug structure 11a approaches its outermost still coherent position with respect to the cylinder tube 3, the pressure of the pressurized fluid within the cavity 30 is reduced, and the velocity of movement of the plug structure 11a with respect to the cylinder tube 3 is gradually further reduced. In this latter condition, an escape of liquid can also take place between the plug structure 11a and the cylinder tube 3, as can be seen in more detail in FIG. 6a. It is to be noted that the before-mentioned leakage effect which can occur between the piston rod 7 and the annular sealing member 19 is similar to the diagrammatic condition as shown in FIG. 6a, and the same is true for a possible leakage effect between the piston member 9a and the cylinder tube 3.

Considering again FIG. 6 and assuming that the plug structure 11a becomes more and more ductile as a result of the increasing temperature, the following situation may come up: The depression 12 which forms a radially inward directed bead 12a as shown in FIGS. 5 and 6 comes into the area of the groove 11c. The bead 12a is not substantially modified in its shape but the material of the plug structure 11a can be easily deformed due to the increased ductility. As such, the contour of the groove 11c can be deformed by the bead 12a. This is particularly true, when the bead 12a comes into engagement with the lower flank $11c_1$ of the groove 11c. Then, in response to further axially outward movement of the plug structure 11a, the cross-sectional area of the groove 11c is increased and the prestress of the annular sealing member 15 is correspondingly reduced. As such, the sealing effect of the annular sealing member 15 is reduced at the location of the depression 12. As a result thereof liquid can escape from the working chamber 30a, before the plug structure 11a leaves the engagement with the cylindrical tube 3. Thus, a fast separation of the plug structure 11a from the cylindrical tube 3 is avoided.

It must again be stressed that an indentation 25 is highly desirable for the behaviour as just described with respect to FIG. 6. If the indentation 25 was not provided, the piston member 9 would have the possibility of shock-like abutment against the plug structure 11a. In such a case there is a risk that the connection between the piston rod 7 and the piston member 9a breaks and the piston rod 7 is shot out of the cavity 30 by the pressurized liquid therein, before the pressure within the working chamber 30a can be reduced.

If, on the other hand, the indentation 25 is provided with a configuration as shown in FIG. 4, the piston member 9a is not suddenly stopped but relatively slowly braked. Then, there is only reduced risk of a rupture in the connection between the piston rod 7 and the piston member 9a. Then, the plug structure 11a can slowly be driven out from the cylindrical tube 3 with the result of an escape of liquid before the plug structure 11a is completely separated from the cylindrical tube 3.

While in FIGS. 1, 2, 5 and 6 the indentation 25 is located excentrically on one side of the axis $A_x$, it is to be noted that the indentation 25 can also be continued along the total circumference of the cylindrical tube 3 or, alternatively, a plurality of individual indentations 25 may be evenly distributed around the circumference of the cylindrical tube 3. In such a modified embodiment, a tilting of the piston rod-piston unit 7,9 is not to be expected. Nevertheless, the risk of a sudden expulsion of the piston rod 7 and/or the plug structure 11a is avoided. The piston member 9a again comes into engagement with the indentation or indentations 25 having the configuration as shown in FIG. 4. Thus, the piston member 9a is slowly braked without tilting. The increased ductility of the plug structure 11a again permits a relatively slow expelling of the plug structure 11a by the pressure of the liquid within the working chamber 30a. When the bead 12a comes into engagement with the groove 11c and more particularly with the lower side wall $11c_1$ of the groove 11c, the groove 11c is again increased in cross-sectional area. The annular sealing member 15 becomes ineffective, and liquid can escape before the plug structure 11a is fully expelled from the cylindrical tube 3.

Figure 7:
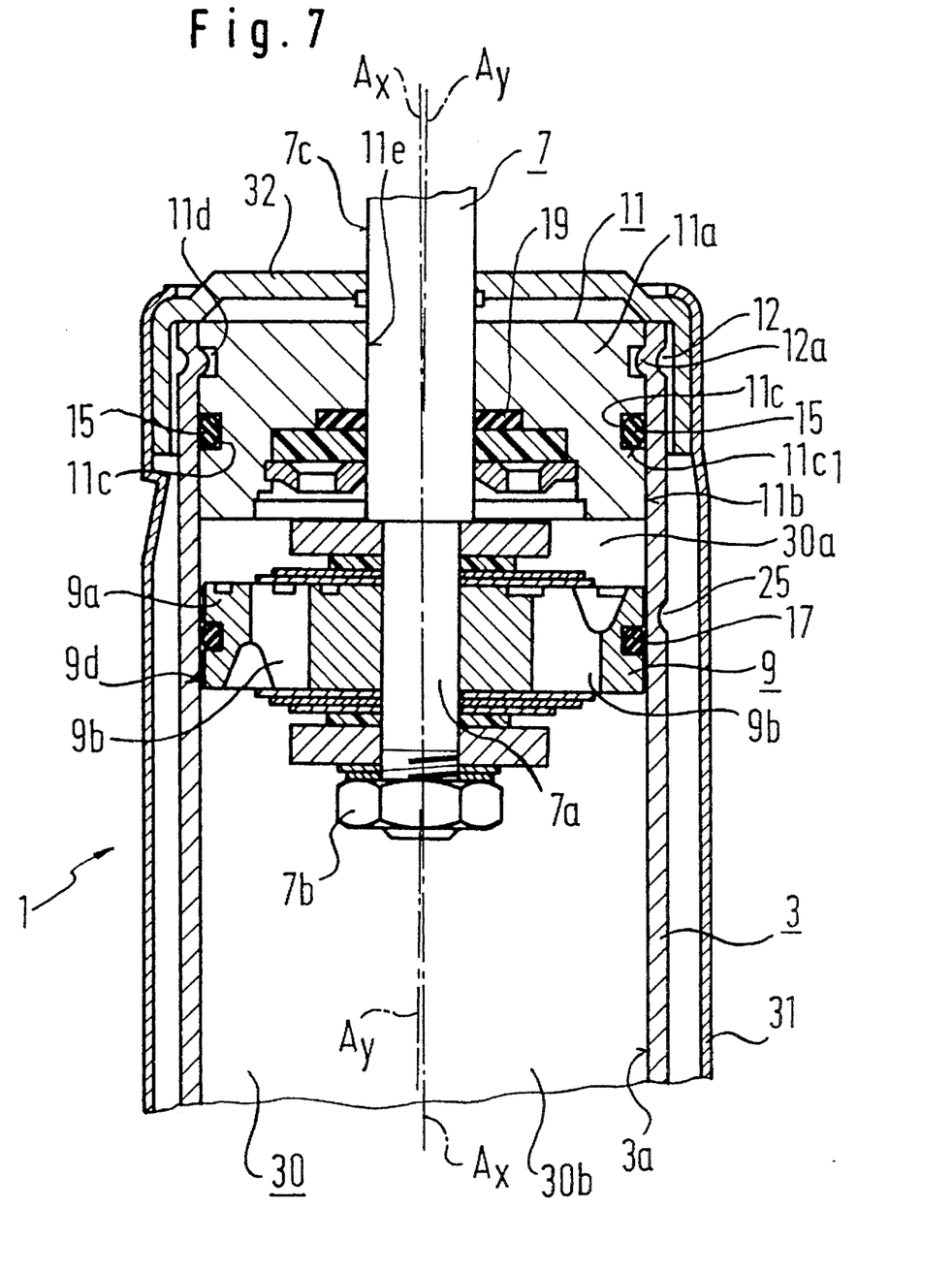
FIG. 7 shows a further condition of an embodiment according to FIGS. 1 and 2 which was achieved in a response to an excessive pressure within the cylinder cavity.

From FIG. 7 one can see that the piston rod-piston unit 7,9 can also abut the plug structure 11a before the plug structure 11a is released from the engagement between the depression 12 and the groove 11d. Also in this condition, the tilting of the axis $A_y$ with respect to the axis $A_x$ occurs. Therefore, the plug structure 11a is frictionally braked against axially outward movement inspite of weakening of the engagement between the plug structure 11a and the cylinder tube at 12, 11d. Thus, the expulsion of the plug structure 11a and of the cylinder piston unit 7,9 is prevented or braked. Simultaneously, again a leakage effect may occur at the engagement of the annular sealing member 19 with the radially outer surface of the piston rod 7 as a result of the tilting at the location of the annular sealing member 15 between the plug structure 11a and the cylinder tube 3. For the leakage effect it is referred again to the diagrammatic illustration as shown in FIG. 6a.

Also in FIG. 7 one can readily understand that the indentation 25 may extend around the complete circumference of the cylindrical tube 3. Alternatively, a plurality of individual indentations 25 may be distributed along the complete circumference of the cylindrical tube 3. Assuming now again that the configuration of the indentation 25 is of the braking type, one can understand that the piston member 9a may relatively slowly approach the position as shown in FIG. 7. Then, there is no risk of rupture of the piston rod 7 from the piston member 9a. Then, the plug structure 11a may at a later stage be slowly expelled from the cylindrical tube 3 in response to increasing ductility of the plug structure 11a and further increasing pressure within the working chamber 30a. Then, again an escape of liquid may occur, when the bead 12a comes into engagement with the lower side wall $11c_1$ of the groove 11c.

It is further to be noted that the position of the groove 11c with respect to the height of the plug structure 11a and the distance of the depression 12 from the upper end of the cylindrical tube 3 may be selected such that the annular sealing member 15 leaves in response to outward movement of the plug structure 11a the engagement with the cylindrical tube 3, before the plug structure 11a loses frictional contact with the cylindrical tube 3. Then, the escape of liquid from the working chamber 30a may occur to a still larger extent, before the coherence between the plug structure 11a and the cylindrical tube 3 is lost.

The leakage effect at any location of possible leakage may be increased by weakening and/or destruction of at least one of the annular sealing members 17, 15 and 19. It is to be noted that the security of the cylinder piston device under extreme temperature conditions against disintegration or explosion may also be based only on a leakage effect obtainable by the tilting torque or exclusively on a damping effect obtainable by the tilting effect or on both effects.

It is further to be noted that an advantageous behaviour of the cylinder piston device may be obtained even without tilting effect thanks to the configuration of the abutment means 25 as illustrated in FIG. 4. When relying only on this configuration as shown in FIG. 4 the reduction of the radius r may be provided along the total circumference of the cylindrical tube 3.

Due to the acute angle $\alpha$ a wedge effect may be obtained between the configuration 25 and the piston unit 9.

The plug structure 11a is not necessarily made of light metal, it may also be made of sintered material such as sintered iron or steel material.

Each of the sealing rings 17, 15 and 19 may be under a slight sealing prestress against the respective engagement face 3a, 11e.

It is also possible to completely avoid the indentation 25. Then, the piston rod-piston unit 7,9 abuts against the piston rod guiding and sealing unit 11. The risk of a fast desintegration may then be reduced solely by slow expulsion of the piston rod guiding and sealing unit 11 in response to increasing ductility of the plug structure 11a with a leakage effect occurring as described above.

The material providing increased ductility in response to increasing temperature may be e.g. aluminium.

While a specific embodiment of the invention has been shown and described in detail to illustrate the application of the inventive principles, it will be understood that the invention may be embodied otherwise without departing from such principles.

The corresponding foreign patent publication application, namely, Federal Republic of Germany Patent Application No. P 42 36 9614, filed on Nov. 2, 1992, having inventors Klaus Kundmüller and Werner Christel, is hereby incorporated by reference as if set forth in its entirety herein.

We claim:

1. A cylinder piston device comprising a substantially cylindrical tube having an axis and two ends and defining a cavity therein, said cavity containing a fluid, said cylindrical tube being provided adjacent a first one of its ends with bottom means and adjacent a second one of its ends with piston rod guiding and sealing means, a piston rod member axially extending through said piston rod guiding and sealing means for axial movement inwards and outwards of said cavity, a piston unit connected to said piston rod member inside said cavity and separating within said cavity two working chambers from each other, said piston rod member and said piston unit being portions of a piston rod-piston unit, said fluid providing increasing pressure in response to an increase of temperature, said piston unit having circumferential, radially outer piston unit face means radially engageable with circumferential, radially inner cylinder tube face means of said cylindrical tube, said piston unit approaching said piston rod guiding and sealing means in response to axial outward movement of said piston rod member, piston rod-piston unit tilting means being provided inside said cylindrical tube in a substantially axially fixed position with respect to said cylindrical tube, said piston rod-piston unit being engageable with said piston rod-piston unit tilting means in response to axially outward movement of said piston rod member, said piston rod-piston unit being submitted to a tilting torque about a tilting axis substantially transverse to said axis of said cylindrical tube in response to said piston rod-piston unit engaging said piston rod-piston unit tilting means and said piston rod-piston unit simultaneously being loaded by an axially outward directed force, said tilting torque providing an improved security against axial separation of said cylindrical tube on the one hand and said at least one of said piston rod-piston unit and said piston rod guiding and sealing means on the other hand under the action of said axially outward directed force.

2. A cylinder piston device as set forth in claim 1, said piston rod guiding and sealing means being sealingly fastened with respect to said cylindrical tube.

3. A cylinder piston device as set forth in claim 1, said piston rod guiding and sealing means comprising a terminal plug structure substantially radially opposite by radially outer circumferential face means thereof to said circumferential, radially inner cylinder tube face means.

4. A cylinder piston device as set forth in claim 3, cylinder-side sealing means being provided between said radially outer circumferential face means of said plug structure and said circumferential, radially inner cylinder tube face means.

5. A cylinder piston device as set forth in claim 3, said terminal plug structure being axially fixed with respect to said cylindrical tube by at least one radially inward directed impression of said cylindrical tube engaging said terminal plug structure.

6. A cylinder piston device as set forth in claim 5, said at least one radially inward directed impression being one of an annular impression and a plurality of circumferentially distributed individual impressions.

7. A cylinder piston device as set forth in claim 1, said piston rod guiding and sealing means comprising a structural body at least partially made of a material having reduced material strength as compared with a material from which said cylindrical tube is made.

8. A cylinder piston device as set forth in claim 7, said cylindrical tube being made of steel, said structural body being made of a light metal such as an aluminium alloy.

9. A cylinder piston device as set forth in claim 1, said piston rod-piston unit tilting means being located such that said piston rod-piston unit, when approaching said piston rod guiding and sealing means, comes into engagement with said piston rod-piston unit tilting means before abutting said piston rod guiding and sealing means.

10. A cylinder piston device as set forth in claim 1, said piston rod-piston unit tilting means comprising abutment means supported by said cylindrical tube.

11. A cylinder piston device as set forth in claim 10, said abutment means comprising a reduction in radius of said circumferential, radially inner cylinder tube face means along at least a part of the circumference thereof.

12. A cylinder piston device as set forth in claim 11, said abutment means comprising at least one of a circumferentially extending indentation of said cylindrical tube and a group of circumferentially arranged individual indentations of said cylindrical tube.

13. A cylinder piston device as set forth in claim 11, said reduction in radius being provided within a circumferential angle about said axis of said cylindrical tube of less than 180°.

14. A cylinder piston device as set forth in claim 1, said tilting torque providing a clamping effect between at least one of the following pairs of circumferentially extending face means mutually engaged in a substantially radial direction:
   a) circumferential, radially outer piston unit face means of said piston unit and circumferential, radially inner cylinder tube face means of said cylindrical tube;
   b) circumferential, radially outer piston rod face means of said piston rod member and circumferential, radially inner guiding face means of said piston rod guiding and sealing means;
   c) circumferential, radially outer face means of said piston rod guiding and sealing means and circumferential, radially inner cylinder tube face means of said cylindrical tube.

15. A cylinder piston device as set forth in claim 1, said cylinder piston device being a mono-tube vibration damper.

16. A cylinder piston device as set forth in claim 1, said fluid comprising a damping liquid within said working chambers and a volume of gas adjacent at least one of said working chambers.

17. A cylinder piston device as set forth in claim 1, said working chambers being interconnected through fluid flow passage means extending across said piston unit.

18. A cylinder piston device as set forth in claim 17, said fluid flow passage means being provided with one of a closing valve means and a damping valve means.

19. A cylinder piston device as set forth in claim 1, said piston rod-piston unit tilting means, comprising a sloped engagement face for being engaged by said piston rod-piston unit when approaching said piston rod guiding and sealing means, said sloped engagement face defining an acute angle with said axis of said cylindrical tube.

20. A cylinder piston device as set forth in claim 1, said tilting torque providing a leakage of said fluid filling means out of said cavity 21. A cylinder piston device as set forth in claim 20, said leakage occurring adjacent at least one of the following sealing means:
   a) sealing means between said piston rod member and said piston rod guiding and sealing means;
   b) sealing means between said cylindrical tube and said piston rod guiding and sealing means;
   c) sealing means between said piston unit and said cylindrical tube.

22. A cylinder piston device comprising a substantially cylindrical tube having an axis and two ends and defining a cavity therein, said cavity containing a fluid, said cylindrical tube being provided adjacent a first one of its ends with bottom means and adjacent a second one of its ends with piston rod guiding and sealing means, a piston rod member axially extending through said piston rod guiding and sealing means for axial movement inwards and outwards of said cavity, a piston unit connected to said piston rod member inside said cavity and separating within said cavity two working chambers from each other, said piston rod member and said piston unit being portions of a piston rod-piston unit, said fluid providing increasing pressure in response to an increase of temperature, said piston unit having circumferential, radially outer piston unit face means radially engageable with circumferential, radially inner cylinder tube face means of said cylindrical tube, said piston unit approaching said piston rod guiding and sealing means in response to axial outward movement of said piston rod member, piston rod-piston unit tilting means being provided in a substantially axially fixed position with respect to said cylindrical tube, said piston rod-piston unit being engageable with said piston rod-piston unit tilting means in response to axially outward movement of said piston rod member, said piston rod-piston unit being submitted to a tilting torque about a tilting axis substantially transverse to said axis of said cylindrical tube in response to said piston rod-piston unit engaging said piston rod-piston unit tilting means and said piston rod-piston unit being simultaneously loaded by an axially outward directed force, said tilting torque providing a leakage of said fluid out of said cavity.

23. A cylinder piston device as set forth in claim 1 or 22, further including said sealing means of at least one of:

said piston rod guiding and sealing means; and said piston unit; being sensitive to increasing temperature such as to facilitate escape of said fluid above a predetermined temperature.

24. A cylinder piston device comprising a substantially cylindrical tube having an axis and two ends and defining a cavity therein, said cavity containing a fluid, said cylindrical tube being provided adjacent a first one of its ends with bottom means and adjacent a second one of its ends with piston rod guiding and sealing means, a piston rod member axially extending through said piston rod guiding and sealing means for axial movement inwards and outwards of said cavity, a piston unit connected to said piston rod member inside said cavity and separating within said cavity two working chambers from each other, said piston rod member and said piston unit being portions of a piston rod-piston unit, said fluid providing increasing pressure in response to an increase of temperature, said piston unit having circumferential, radially outer piston unit face means radially engageable with circumferential, radially inner cylinder tube face means of said cylindrical tube, said piston unit approaching said piston rod guiding and sealing means in response to axial outward movement of said piston rod member, piston rod-piston unit tilting means being provided in a substantially axially fixed position with respect to said cylindrical tube, said piston rod-piston unit being engageable with said piston rod-piston unit tilting means in response to axially outward movement of said piston rod member, said piston rod-piston unit being submitted to a tilting torque about a tilting axis substantially transverse to said axis of said cylindrical tube in response to said piston rod-piston unit engaging said piston rod-piston unit tilting means and said piston rod-piston unit simultaneously being loaded by an axially outward directed force, said tilting torque increasing coherence between said cylindrical tube and at least one of said piston rod-piston unit and said piston rod guiding and sealing means to provide an improved security against axial separation of said cylindrical tube on the one hand and said at least one of said piston rod-piston unit and said piston rod guiding and sealing means on the other hand under the action of said axially outward directed force, said piston rod-piston unit tilting means being located such that said piston rod-piston unit, when approaching said piston rod guiding and sealing means, comes into engagement with said piston rod-piston unit tilting means before abutting said piston rod guiding and sealing means.

25. A cylinder piston device comprising a substantially cylindrical tube having an axis and two ends and defining a cavity therein, said cavity containing a fluid, said cylindrical tube being provided adjacent a first one of its ends with bottom means and adjacent a second one of its ends with piston rod guiding and sealing means, a piston rod member axially extending through said piston rod guiding and sealing means for axial movement inwards end outwards of said cavity, a piston unit connected to said piston rod member inside said cavity and separating within said cavity two working chambers from each other, said piston rod member and said piston unit being portions of a piston rod-piston unit, said fluid providing increasing pressure in response to an increase of temperature, said piston unit having circumferential, radially outer piston unit face means radially engageable with circumferential, radially inner cylinder tube face means of said cylindrical tube, said piston unit approaching said piston rod guiding and sealing means in response to axial outward movement of said piston rod member, piston rod-piston unit tilting means being provided in a substantially axially fixed position with respect to said cylindrical tube, said piston rod-piston unit being engageable with said piston rod-piston unit tilting means in response to axially outward movement of said piston rod member, said piston rod-piston unit being submitted to a tilting torque about a tilting axis substantially transverse to said axis of said cylindrical tube in response to said piston rod-piston unit engaging said piston rod-piston unit tilting means and said piston rod-piston unit simultaneously being loaded by an axially outward directed force, said tilting torque increasing coherence between said cylindrical tube and at least one of said piston rod-piston unit and said piston rod guiding and sealing means to provide an improved security against axial separation of said cylindrical tube on the one hand and said at least one of said piston rod-piston unit and said piston rod guiding and sealing means on the other hand under the action of said axially outward directed force, said piston rod-piston unit tilting means comprising abutment means supported by said cylindrical tube, and said abutment means comprises a reduction in radius of said circumferential, radially inner cylinder tube face means along at least a part of the circumference thereof.

26. A cylinder piston device as set forth in claim 25, wherein said abutment means comprises at least one of: a circumferentially extending indentation of said cylindrical tube; and a group of circumferentially arranged individual indentations of said cylindrical tube.

27. A cylinder piston device as set forth in claim 25, wherein said reduction in radius is provided within a circumferential angle about said axis of said cylindrical tube of less than 180°.

* * * * *

UNITED STATES PATENT AND TRADEMARK OFFICE
CERTIFICATE OF CORRECTION

PATENT NO. : 5,454,455
DATED : October 3, 1995
INVENTOR(S) : Klaus KUNDMÜLLER and Werner CHRISTEL It is certified that error appears in the above-indentified patent and that said Letters Patent is hereby corrected as shown below:

In column 4, line 40, after 'obtaining', delete "a-relatively" and insert --a relatively--.

In column 8, line 8, after 'unit', delete "7 9" and insert --7,9--.

In column 10, line 55, after 'No.', delete "P 42 36 9614," and insert --P 42 36 961.4

In column 14, line 18, Claim 25, after 'inwards', delete "end" and insert --and--.

Signed and Sealed this

Twenty-first Day of January, 1997

Attest:

BRUCE LEHMAN

Attesting Officer    Commissioner of Patents and Trademarks